W. KREBS.
AUTOMOBILE SIGNAL.
APPLICATION FILED NOV. 11, 1913.

1,112,457.

Patented Oct. 6, 1914.
2 SHEETS—SHEET 1.

Witnesses
Dudley Swan
Beulah Carle.

Inventor
William Krebs,
by Frederick W. Cameron.
Atty.

W. KREBS.
AUTOMOBILE SIGNAL.
APPLICATION FILED NOV. 11, 1913.
1,112,457.
Patented Oct. 6, 1914.
2 SHEETS—SHEET 2.
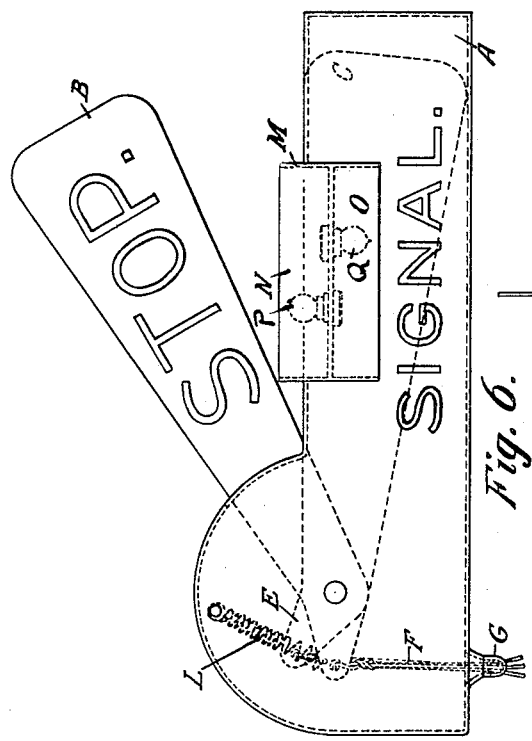
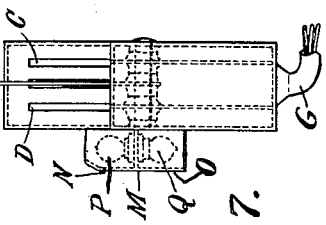
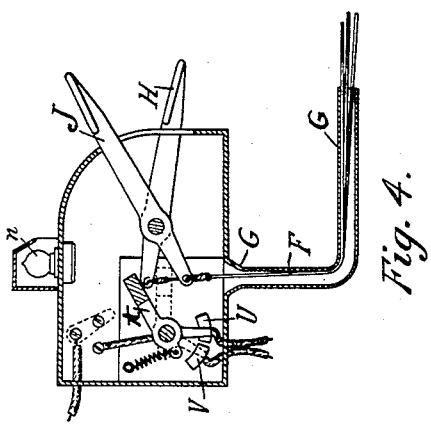
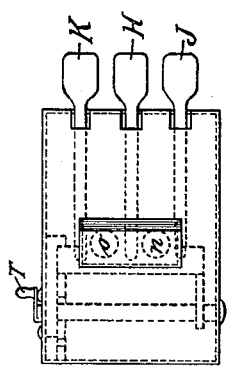
WITNESSES:
INVENTOR
William Krebs,
BY Frederick W. Cameron,
ATTY.

UNITED STATES PATENT OFFICE.

WILLIAM KREBS, OF ALBANY, NEW YORK, ASSIGNOR OF ONE-HALF TO ALBERT L. DUTCHER, OF MENANDS, NEW YORK.

AUTOMOBILE-SIGNAL.

1,112,457. Specification of Letters Patent. Patented Oct. 6, 1914.

Application filed November 11, 1913. Serial No. 800,305.

*To all whom it may concern:*

Be it known that I, WILLIAM KREBS, a citizen of the United States of America, residing at the city of Albany, in the county of Albany and State of New York, have invented certain new and useful Improvements in Automobile-Signals, of which the following is a specification.

Figure 3:
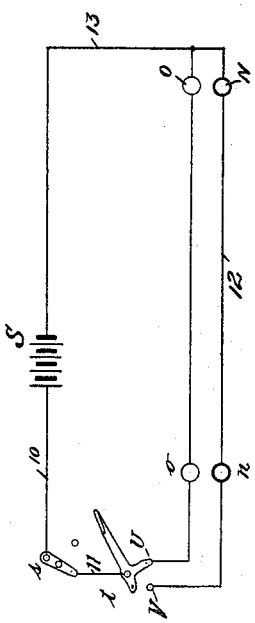
Figure 1:
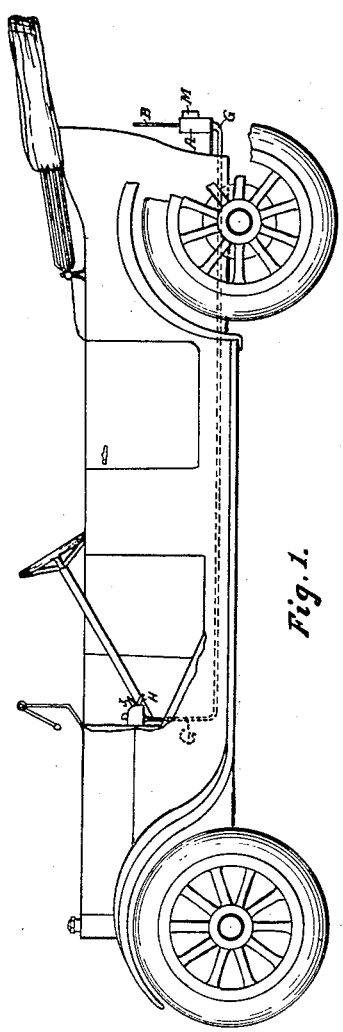
Figure 2:
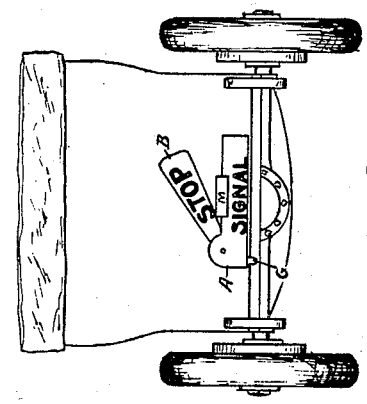

My invention relates to automobile signals, and the object of my invention is to provide one or more signals and means by which the driver may display them at the rear of an automobile; together with such elements and combinations as are hereinafter more particularly set forth and claimed. I accomplish these objects by means of the mechanism illustrated in the accompanying drawings, in which:

Figure 1 is a side elevation, with parts broken away, of an automobile provided with my invention. Fig. 2 is an end elevation of an automobile. Fig. 3 is a diagram of the wiring. Fig. 4 is a side elevation of the operating means at the forward part of the automobile. Fig. 5 is a plan of the mechanism shown in Fig. 4. Fig. 6 is an elevation of the signal and lamps at the rear of the automobile. Fig. 7 is an end elevation of the signal box.

Similar letters refer to similar parts throughout the several views.

In a suitable box, A, which I call a signal box, at the rear of the automobile, attached thereto in any suitable manner, I place one or more semaphore signals, B, C and D. On the face of the box I preferably put the word Signal, as shown in Figs. 2 and 6. One of the semaphores preferably contains the word Stop, as shown in said figures. On another of said semaphores I preferably put the word Right, and on the other the word Left, for the purpose of indicating to the driver of a following car that the automobile containing this signal is either to stop or turn to the right or left, depending upon the signal shown.

For the purpose of displaying a semaphore I provide on its end an ear, E, which extends from the end of the semaphore projecting beyond the side thereof and making with said side an obtuse angle, as shown in Fig. 6. Near the end of the ear, E, I secure a wire, F, which extends through a suitable tube, G, leading to the forward part of the car where the wire, F, is attached to one end of a pedal lever, H, as shown in Fig. 4, all so arranged that when the pedal lever is depressed, as shown in Fig. 4, the semaphore, B, for instance, containing the word Stop, is displayed. When the pedal lever, J, is depressed the semaphore, C, containing the word Right, is displayed, and when the pedal lever, K, is depressed the semaphore, D, containing the word Left, is displayed. I attach a spring, L, to each of the ears, E, at the ends of the semaphores for the purpose of causing the semaphores to return to their position in the box, A, when the levers, H, J and K, are released.

For the purpose of calling attention to my signal at night, I have provided a box, M, which may be attached to the front of the signal box, A, provided along its upper portion, when in the position shown in Figs. 2, 6 and 7, with a glass, N, preferably colored red, and having its lower portion provided with a glass, O, preferably colored green. In the box I place two electric lamps, P, pointing upward and immediately back of the glass, N, the other, Q, pointing downward back of the glass, O. The red light will shine against the up-raised semaphore, the green light against the word Signal on the box, A.

In the front of the automobile I put the pilot lamp, n, covered by a glass colored red, and the pilot lamp, o, which may be simply white or green. The red pilot lamp, n, and the red light, N, are in the same circuit, while the pilot lamp, o, and the light, O, are in a different circuit. I preferably wire the lamps in connection with the battery as shown in Fig. 3, in which the battery, S, is connected with an "on and off" switch, s, by wire, 10, said switch operated by a movable contact, T, (see Fig. 5,) the switch, s, being connected to the pedal switch, t, by a wire, 11. From the contact plate, U, with which the pedal switch engages when the pedal is depressed as shown by full lines in Fig. 4, the current will be through the red pilot lamp, n, in the front of the automobile illuminating the light, P, in the rear, and throwing the light upon the raised semaphore, the current being conducted to the lamps by the wire, 12. When the lever is in its normal position, as shown by lever, J, in Fig. 4, the pedal switch is on contact plate, V, and the pilot lamp, o, in front and the light, Q, in the rear will be lighted and the word Signal on the signal box will be displayed.

When there is no necessity for having any light, as in the daytime, the contact plate, T, on the "on and off" switch may be turned to its off position which will disconnect the battery from the lamp circuits.

I do not confine myself to the means of attachment of the wire and semaphores, as any suitable arrangement for displaying the semaphores comes within the spirit of my invention. In practice, however, I have found that a stiff or spring wire is preferable to a cord or other cable for connecting the pedal lever with the signal.

What I claim as my invention and desire to secure by Letters Patent is:

The combination of a signal for automobiles, comprising a signal box, with the word Signal thereon, adapted to be secured to the rear of an automobile; two or more signals in said box adapted to be displayed; a series of pedal levers; means at the end of each signal for attaching a stiff wire thereto; a stiff wire extending from the end of each signal to said pedal levers, respectively, in position to be operated by the driver; two lamps mounted adjacent to the box containing the signals; means for illuminating said lamps, one of said lamps being normally lighted and throwing its rays upon the word Signal on the box; and means connected with said levers for extinguishing the light shining on the word Signal and simultaneously illuminating the other lamp which throws a colored light upon the displayed signal when a lever is moved to display a signal.

In testimony whereof I have affixed my signature in presence of two witnesses.

WILLIAM KREBS.

Witnesses:
FREDERICK W. CAMERON,
BEULAH CARLE.